(No Model.)
R. EVANS.
NECK YOKE.
No. 573,507. Patented Dec. 22, 1896.
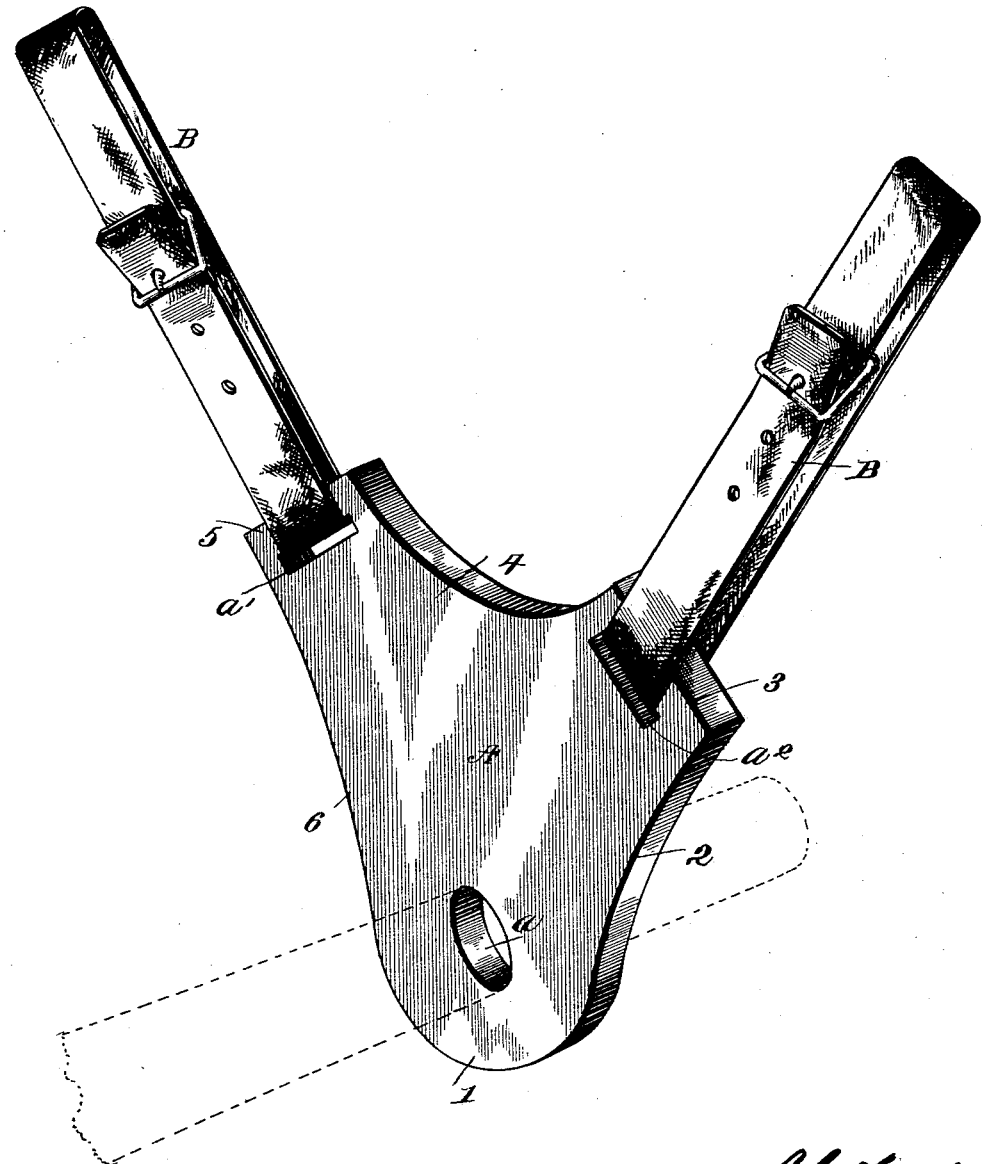
Witnesses
Robert Evans
Inventor
by Walter P. Berry
Attorney

UNITED STATES PATENT OFFICE.

ROLAND EVANS, OF WASHINGTON, DISTRICT OF COLUMBIA.

NECK-YOKE.

SPECIFICATION forming part of Letters Patent No. 573,507, dated December 22, 1896.

Application filed October 10, 1896. Serial No. 608,472. (No model.)

*To all whom it may concern:*

Be it known that I, ROLAND EVANS, a citizen of the United States, residing at Washington city, in the District of Columbia, have invented certain new and useful Improvements in Neck-Yokes; and I do hereby declare the following to be a full, clear, and exact description of my invention, such as will enable others skilled in the art to which it appertains to make and use the same, reference being had to the accompanying drawing.

This invention is an improvement in neck-yokes, and has for its objects to provide a neck-yoke which may be adjusted easily, which will be light in weight, and neat in appearance.

The invention has for further objects the carrying of the pole in the steadiest and evenest manner possible and such a distribution of the weight thereof that there will be no galling of the withers or shoulders of the horses and, furthermore, to regulate the distance between the horses and their relation to the carriage, and as a substitute for a pole cross-piece.

With these objects in view the invention resides in the various novel details of construction, and in the combinations of the parts hereinafter fully described, and particularly pointed out in the claims.

I have illustrated my invention in the accompanying drawing, in which A indicates a pole-piece formed of leather, metal, rubber, or any other material, and having an approximately triangular contour. The pole-piece A may for strength be made of four-ply leather, or of metal, or any other substance of sufficient strength, and is provided with a circular opening $a$, which is adapted to receive the point of the pole of a carriage, and has rectangular strap-openings $a'$ and $a^2$ equidistant from the pole-opening $a$. The contour of the pole-piece is adapted to economy of material in its construction and is designed to combine lightness of weight with the greatest possible strength. For this purpose the outer edge of the pole-piece near the opening $a$ is a convex curve nearly concentric with the said opening, as indicated by 1, and the said outer edge becomes a concave curve between the rectangular strap-openings $a'$ and $a^2$ and the pole-opening $a$, as shown at 2 and 6. 3 and 5 indicate the straight portions of the outer edge adjacent to the aforesaid strap-openings and parallel therewith, and 4 indicates a concave curve in the said outer edge, the same being cut away between the lines 3 and 5.

In using my invention the pole-piece A is slipped over the outer end of the pole of a carriage about five or six inches, and may either be secured there in a convenient manner or not, as may be deemed best. Through the strap-openings $a'$ and $a^2$ straps, such as B, are passed and are buckled or fastened to the collars of the horses on either side of the pole. It will be obvious that the weight of the pole and the draft of the carriage will be evenly distributed between the two animals, and falling upon their collars will be more easily borne than by the ordinary arrangement of poles, cross-poles, and neck-yokes.

The arrangement shown and described is the one I prefer, but other contours may be adopted without departing from my invention, the essential features of which are pointed out in the claims.

Having thus fully described my invention, what I claim as new, and desire to secure by Letters Patent, is—

1. A neck-yoke consisting of a pole-piece having approximately a triangular contour and provided with a pole-opening and two strap-openings, one in each corner of the pole-piece, and straps engaging the strap-openings.

2. A neck-yoke consisting of a pole-piece A and the straps B, the pole-piece having the opening $a$, and having its outer edge approximately of a triangular contour, following the lines 1, 2, 3, 4, 5, and 6.

In testimony whereof I affix my signature hereto in the presence of two witnesses.

ROLAND EVANS.

Witnesses:
E. W. WATERMAN,
A. J. TRUSSELL.